United States Patent
Lee et al.

(10) Patent No.: US 11,347,350 B2
(45) Date of Patent: May 31, 2022

(54) TOUCH DISPLAY DEVICE

(71) Applicant: LG DISPLAY CO., LTD., Seoul (KR)

(72) Inventors: HwiDeuk Lee, Gyeonggi-do (KR);
YangSik Lee, Gyeonggi-do (KR);
ChangSeok Oh, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/923,954

(22) Filed: Jul. 8, 2020

(65) Prior Publication Data

US 2021/0026489 A1 Jan. 28, 2021

(30) Foreign Application Priority Data

Jul. 24, 2019 (KR) .......................... 10-2019-0089860

(51) Int. Cl.
*G06F 3/041* (2006.01)
*G06F 3/044* (2006.01)
*G06F 3/047* (2006.01)

(52) U.S. Cl.
CPC ............ *G06F 3/0418* (2013.01); *G06F 3/047* (2013.01); *G06F 3/0412* (2013.01); *G06F 3/0446* (2019.05)

(58) Field of Classification Search
None
See application file for complete search history.

(56) References Cited

U.S. PATENT DOCUMENTS

2008/0238881 A1\* 10/2008 Perski ................... G06F 3/0446
345/173
2014/0198066 A1\* 7/2014 Yoshida ................ G06F 3/0443
345/173
2019/0237533 A1\* 8/2019 Kim .................... H01L 51/5246

\* cited by examiner

*Primary Examiner* — Matthew Yeung
(74) *Attorney, Agent, or Firm* — Birch, Stewart, Kolasch & Birch, LLP

(57) ABSTRACT

Embodiments of the present disclosure relate to a touch display device, in which touch routing lines arranged in a non-active area do not overlap signal lines supplying a signal for driving a display, and in which the size of the area in which a connection electrode, which is positioned between the touch routing lines and the signal lines, overlaps the signal lines is reduced, thereby reducing direct and indirect noise due to the signal lines. In addition, the noise due to the signal lines can be dispersed through a shielding electrode by arranging the shielding electrode, to which a constant voltage is applied, in an opening in the connection electrode, thereby further reducing the noise of a touch sensing signal and improving touch sensing performance thereof.

16 Claims, 10 Drawing Sheets

TOUCH DISPLAY DEVICE

CROSS REFERENCE TO RELATED APPLICATION

This application claims priority to Korean Patent Application No. 10-2019-0089860, filed on Jul. 24, 2019 in the Republic of Korea, the entire contents of which are hereby expressly incorporated by reference for all purposes as if fully set forth herein into the present application.

BACKGROUND

1. Field

Embodiments of the present disclosure relate to a touch display device.

2. Description of the Related Art

The advent of the information-based society has brought increasing demand for display devices for displaying images, and various types of display devices such as liquid crystal display devices, organic light-emitting display devices, and the like are being utilized.

In order to provide a variety of functions to users, the display device provides a function of recognizing a touch on a display panel using a user's finger or pens and performing an input process on the basis of the recognized touch.

For example, sensors for sensing a touch and lines can be arranged on the display panel, and a change in capacitance due to a user's touch on the display panel can be detected, thereby sensing the user's touch.

In this case, the display panel includes various electrodes and lines for driving the display, in addition to the configuration for sensing a touch, which may cause the formation of parasitic capacitance between the electrodes for driving the display and the sensors for sensing a touch, which may degrade the performance of touch sensing.

BRIEF SUMMARY

Embodiments of the present disclosure provide an improved touch display device capable of reducing parasitic capacitance between a signal line to which a signal for driving a display is applied and a touch routing line for detecting a touch sensing signal.

Embodiments of the present disclosure provide an improved touch display device capable of reducing noise in a touch sensing signal due to a signal line that can form parasitic capacitance with a touch routing line.

In an aspect, embodiments of the present disclosure can provide a touch display device including an active area in which a plurality of subpixels is arranged; a non-active area positioned outside the active area and in which a plurality of signal lines is arranged; a plurality of touch electrodes arranged in the active area; and a plurality of touch routing lines arranged in the non-active area and electrically connected to the touch electrodes.

The touch display device can include a connection electrode that is positioned between the signal lines and the touch routing lines in the non-active area, is electrically connected to a common electrode disposed in the subpixel, and at least a portion thereof includes at least one opening positioned in an area overlapped with the signal lines.

In addition, the touch display device can include at least one shielding electrode, which is disposed in the opening of the connection electrode so as to be insulated from the connection electrode, and to which a constant voltage is applied.

In another aspect, embodiments of the present disclosure can provide a touch display device including a substrate including an active area in which a plurality of subpixels is arranged and a non-active area in which a plurality of signal lines is arranged; an adhesive layer arranged on the substrate; a touch sensing unit arranged on the adhesive layer and including a plurality of touch electrodes arranged on the active area and a plurality of touch routing lines arranged on the non-active area; a connection electrode positioned between the signal lines and the adhesive layer in the non-active area, electrically connected to a common electrode disposed in the subpixel, and at least a portion thereof includes at least one opening positioned in an area overlapped with the signal lines; and at least one shielding electrode disposed in the opening of the connection electrode so as to be insulated from the connection electrode and to which a constant voltage is applied.

According to embodiments of the present disclosure, a touch routing line can be disposed so as not to overlap the signal line to which a signal for driving a display is applied, and openings can be formed in a connection electrode disposed between the touch routing line and the signal line and connected to a common electrode, thereby reducing parasitic capacitance that is foiled between the touch routing line and the signal line.

According to embodiments of the present disclosure, a shielding electrode, to which a constant voltage is applied, can be disposed in the opening of the connection electrode so as to be insulated from the connection electrode so that noise due to the signal lines positioned under the shielding electrode can be dispersed, thereby reducing the noise of a touch sensing signal detected through the touch routing lines.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE PREFERRED EMBODIMENTS

Figure 1:
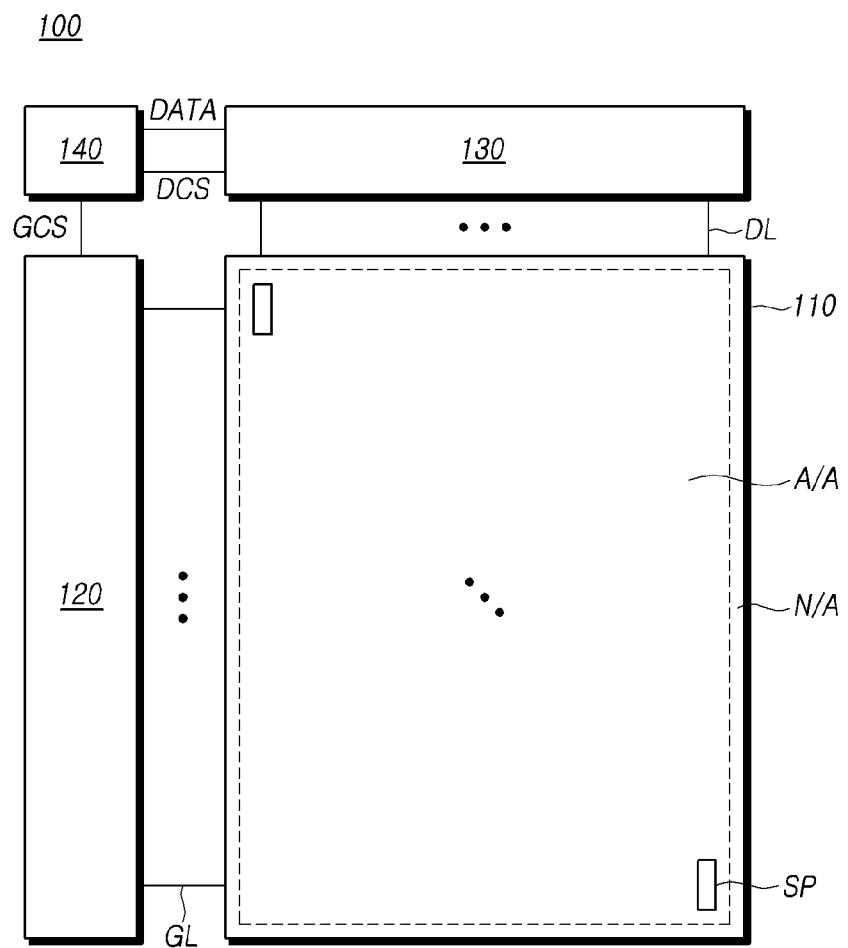
FIG. 1 is a diagram illustrating the schematic configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element is "connected to" or "coupled to", "contacts" or "overlaps," etc. a second element, it should be interpreted that, not only can the first element "be directly connected or coupled to" or "directly contact or overlap" the second element, but a third element (or additional elements) can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the team "can".

FIG. 1 is a diagram illustrating the schematic configuration of a touch display device 100 according to embodiments of the present disclosure. All the components of the touch display device according to all embodiments of the present disclosure are operatively coupled and configured.

Referring to FIG. 1, the touch display device 100 according to the embodiments of the present disclosure can include a touch display panel 110 including an active area A/A in which a plurality of subpixels SP is arranged and a non-active area N/A positioned outside the active area A/A. In addition, the touch display device 100 can include a gate driving circuit 120, a data driving circuit 130, and a controller 140 for driving various signal lines and the like provided on the touch display panel 110.

A plurality of gate lines GL and a plurality of data lines DL can be arranged on the touch display panel 110, and subpixels SP can be disposed in the areas where the gate lines GL and the data lines DL intersect each other.

The gate driving circuit 120 is controlled by the controller 140, and sequentially outputs scan signals to the plurality of gate lines GL arranged on the touch display panel 110, thereby controlling the driving timing of the plurality of subpixels SP.

The gate driving circuit 120 can include one or more gate driver integrated circuits (GDICs), and can be positioned only on one side of the touch display panel 110, or can be positioned on both sides (or other sides) thereof depending on the driving method.

Each gate driver integrated circuit (GDIC) can be connected to a bonding pad of the touch display panel 110 by a tape automated bonding (TAB) method or a chip-on-glass (COG) method, or can be implemented by a gate-in-panel (GIP) method to then be directly arranged on the touch display panel 110. In some cases, the gate driver integrated circuit (GDIC) can be integrated with the touch display panel 110. In addition, each gate driver integrated circuit (GDIC) can be implemented by a chip-on-film (COF) method in which an element is mounted on a film connected to the touch display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each subpixel SP emits light having brightness according to the image data.

The data driving circuit 130 can include one or more source driver integrated circuits (SDICs).

Each source driver integrated circuit (SDIC) can include a shift register, a latch circuit, a digital-to-analog converter, an output buffer, and the like.

Each source driver integrated circuit (SDIC) can be connected to a bonding pad of the touch display panel 110 by a tape automated bonding (TAB) method or a chip-on-glass (COG) method, or can be directly disposed on the touch display panel 110. Alternatively, in some cases, the source driver integrated circuit (SDIC) can be integrated with the touch display panel 110. In addition, each source driver integrated circuit (SDIC) can be implemented by a chip-on-film (COF) method in which each source driver integrated circuit (SDIC) can be mounted on a film connected to the touch display panel 110, and can be electrically connected to the touch display panel 110 through wires on the film.

The controller 140 supplies various control signals to the gate driving circuit 120 and the data driving circuit 130, and controls the operation of the gate driving circuit 120 and the data driving circuit 130. The controller 140 can be composed of or include one or more processors.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, converts image data received from the outside into the data signal format used in the data driving circuit 130, and then outputs the converted image data to the data driving circuit 130.

The controller 140 receives, from the outside (e.g., a host system), various timing signals including a vertical synchronization signal (VSYNC), a horizontal synchronization signal (HSYNC), an input data enable (DE) signal, a clock signal (CLK), and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse (GSP), a gate shift clock (GSC), a gate output enable signal (GOE), or the like.

In this case, the gate start pulse (GSP) controls the operation start timing of one or more gate driver integrated circuits (GDICs) constituting the gate driving circuit 120. The gate shift clock (GSC), which is a clock signal commonly input to one or more gate driver integrated circuits (GDICs), controls the shift timing of a scan signal. The gate output enable signal (GOE) specifies timing information on one or more gate driver integrated circuits (GDICs).

In addition, in order to control the data driving circuit 130, the controller 140 outputs various data control signals DCS including a source start pulse (SSP), a source sampling clock (SSC), a source output enable signal (SOE), or the like.

In this case, the source start pulse (SSP) controls a data sampling start time of one or more source driver integrated circuits (SDICs) constituting the data driving circuit 130. The source sampling clock (SSC) is a clock signal for controlling the timing of sampling data in the respective source driver integrated circuits (SDICs). The source output enable signal (SOE) controls the output timing of the data driving circuit 130.

The touch display device 100 can further include a power management integrated circuit for supplying various voltages or currents to the touch display panel 110, the gate driving circuit 120, the data driving circuit 130, and the like or controlling various voltages or currents to be supplied thereto.

A liquid crystal or one or more emission elements can be disposed in each subpixel SP depending on the type of the touch display panel 110. In addition, a pixel electrode to which a data voltage is applied and a common electrode to which a common voltage is applied can be disposed.

In addition, the touch display device 100 can include sensors for sensing a user's touch on the touch display panel 110, lines, driving circuits, and the like.

Figure 2:
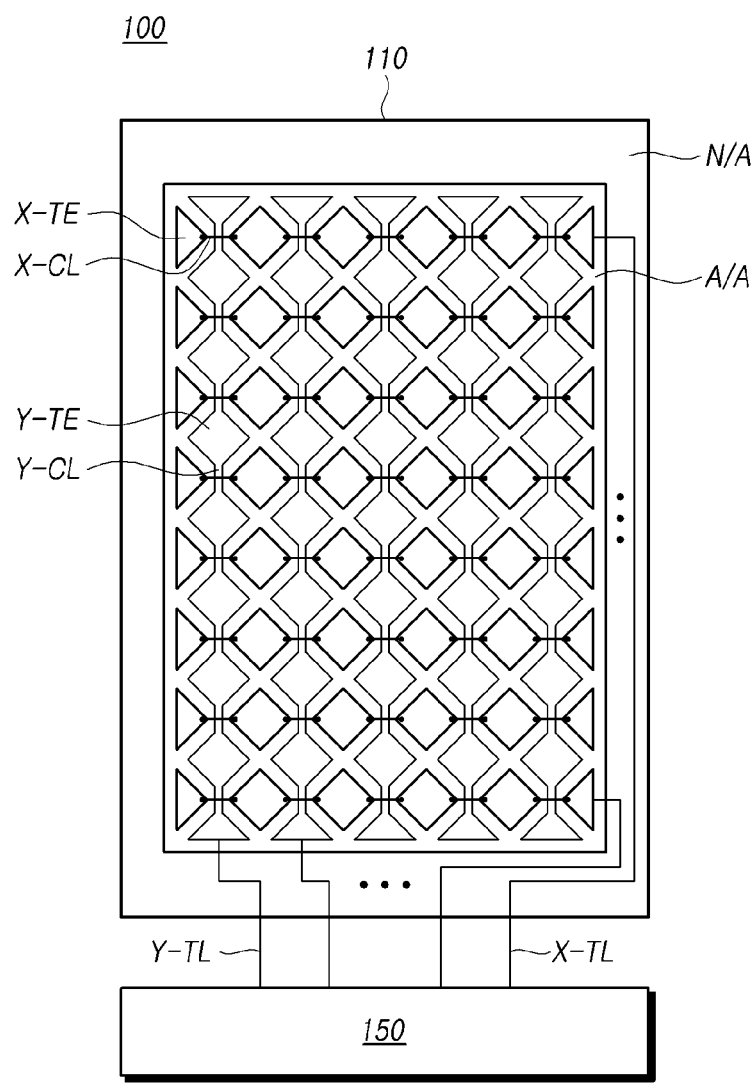
FIG. 2 is a diagram illustrating an example of the schematic structure of a touch electrode and a touch routing line disposed on a touch display device according to embodiments of the present disclosure.

FIG. 2 is a diagram illustrating an example of the schematic structure of a touch electrode TE and a touch routing line TL disposed on a touch display device 100 according to embodiments of the present disclosure.

Referring to FIG. 2, the touch display device 100 according to the embodiments of the present disclosure can include a plurality of touch electrodes TE positioned in an active area A/A, a touch sensing circuit 150 for driving the touch electrodes TE and detecting a touch on the touch display panel 110, and a plurality of touch routing lines TL for connecting the touch electrodes TE and the touch sensing circuit 150 to each other.

The touch electrode TE, for example, can be a transparent electrode, or can be an opaque electrode, at least a portion of which has openings therein. In the case where the touch electrode TE has openings therein, the touch electrode TE can be in the form of a mesh, and the openings in the touch electrode TE can overlap the emission area arranged in each subpixel SP.

Depending on the arrangement of the touch electrodes TE and the touch sensing method, a touch routing line TL can be connected to a plurality of touch electrodes TE, or one or more touch routing lines TL can be connected to each of the touch electrodes TE.

The touch electrodes TE and the touch routing lines TL can be arranged in various forms depending on the method of detecting a touch.

For example, as shown in the example in FIG. 2, a plurality of touch electrodes TE can include a plurality of X-touch electrodes X-TE arranged in the X-axis direction and a plurality of Y-touch electrodes Y-TE arranged in the Y-axis direction. In addition, the X-touch electrode X-TE and the Y-touch electrode Y-TE can be arranged in the same layer. Here, the X-axis direction and the Y-axis direction are preferably perpendicular to each other, and are not limited to the directions shown in FIG. 2.

Neighboring X-touch electrodes X-TE can be connected to each other by X-touch electrode connection lines X-CL arranged between the X-touch electrodes X-TE, and neighboring Y-touch electrodes Y-TE can be connected to each other by Y-touch electrode connection lines Y-CL arranged between the Y-touch electrodes Y-TE. One of either the X-touch electrode connection lines X-CL or the Y-touch electrode connection lines Y-CL can be arranged in a layer different from that of the touch electrodes TE. For example, as shown in the example in FIG. 2, the Y-touch electrodes Y-TE can be connected to each other by the Y-touch electrode connection lines Y-CL arranged in the same layer as the Y-touch electrodes Y-TE, and the X-touch electrodes X-TE can be connected to each other by the X-touch electrode connection lines X-CL arranged in a layer different from that of the X-touch electrodes X-TE.

In addition, the X-touch electrodes X-TE can be connected to the touch sensing circuit 150 by X-touch routing lines X-TL arranged at one side of the touch display panel 110, and the Y-touch electrodes Y-TE can be connected to the touch sensing circuit 150 by Y-touch routing lines Y-TL arranged at the lower side of the touch display panel 110. Alternatively, in some cases, the touch routing lines TL can be arranged at both sides of the touch display panel 110. For example, the X-touch routing lines X-TL can be arranged at both the left side and the right side of the touch display panel 110, and can be connected to the X-touch electrodes X-TE. In addition, the Y-touch routing lines Y-TL can be arranged at the upper side and the lower side of the touch display panel 110, and can be connected to the Y-touch electrodes Y-TE. The above connection structure of the touch routing lines TL can reduce the RC load of the touch routing lines TL, thereby improving signal detection performance through the touch routing lines TL.

In the structure of the touch electrodes TE described above, touch driving signals can be applied to the X-touch electrodes X-TE or the Y-touch electrodes Y-TE in a touch driving period, and touch sensing signals can be detected from the Y-touch electrodes Y-TE or the X-touch electrodes X-TE. For example, touch driving signals can be applied to the Y-touch electrodes Y-TE, and touch sensing signals can be detected from the X-touch electrodes X-TE. For example, while different signals are applied to the X-touch electrodes X-TE and the Y-touch electrodes Y-TE, a change in mutual capacitance between an X-touch electrode X-TE and a Y-touch electrode Y-TE, which is generated by a touch, can be detected, thereby sensing a touch.

Alternatively, in some cases, the plurality of touch electrodes TE can be arranged separately from each other, and touch driving signals can be applied to the respective touch electrodes TE. Then, a change in self-capacitance due to a touch can be detected, thereby sensing the touch on the touch display panel 110.

The touch sensing circuit 150 can drive the touch electrodes TE through the touch routing lines TL, and can detect touch sensing signals from the touch electrodes TE, thereby sensing a touch. The touch sensing circuit 150, for example, can include a touch driving circuit for outputting a touch driving signal to the touch electrodes TE and detecting a touch sensing signal, and a touch controller for controlling the touch driving circuit and detecting whether or not a touch has been made and the coordinates of the touch on the basis of the signal detected by the touch driving circuit.

For example, the touch driving circuit can include an operational amplifier, which is connected to the touch routing lines TL, supplies a touch driving signal, and receives a touch sensing signal, and a feedback capacitor, which accumulates charges according to the signal received by the operational amplifier. In addition, the touch driving circuit can include an integrator for processing output signals of the operational amplifier, a sample and hold circuit, an analog-to-digital converter, and the like. For example, the touch driving circuit can generate digital touch sensing data on the basis of the analog touch sensing signal detected from the touch electrode TE, and can output the generated touch sensing data to the touch controller.

The touch driving circuit can be provided as a separate circuit on the touch display panel 110, or, in some cases, can be implemented to be integrated with the data driving circuit 130.

The touch electrodes TE and the touch routing lines TL can be embedded in the touch display panel 110 in some cases, and a separate structure providing a touch sensing function can be attached to the touch display panel 110. In addition, in the case where the touch electrodes TE and the like are embedded in the touch display panel 110, electrodes, arranged on the touch display panel 110, for driving a display can be used as the touch electrodes TE, or separate electrodes can be arranged to provide the functions of the touch electrodes TE.

For example, common electrodes COM can be arranged in a divided state on the touch display device 100, and the divided common electrodes COM can be used as respective touch electrodes TE. In this case, touch driving signals are applied to the common electrodes COM so that the touch driving can be performed in a period different from the period for the display driving. Alternatively, a data voltage and the like can be modulated on the basis of the touch driving signal, so that the touch driving and the display driving can be performed simultaneously.

In addition, separate electrodes can be arranged on the touch display panel 110, thereby providing the functions of the touch electrodes TE. For example, in the case where the touch display panel 110 is an organic light-emitting display panel, electrodes can be arranged on an encapsulation layer protecting emission elements, thereby realizing the touch electrodes TE and the touch routing lines TL. In this case, at least one insulating layer can be interposed between the encapsulation layer and the touch electrodes TE, and the touch routing lines TL can be arranged along the inclined surface of the encapsulation layer in a pad area.

In addition, a separate structure for touch sensing, including the touch electrodes TE, the touch routing lines TL, and the like, can be arranged on the touch display panel 110 in order to provide a touch sensing function.

Figure 3:
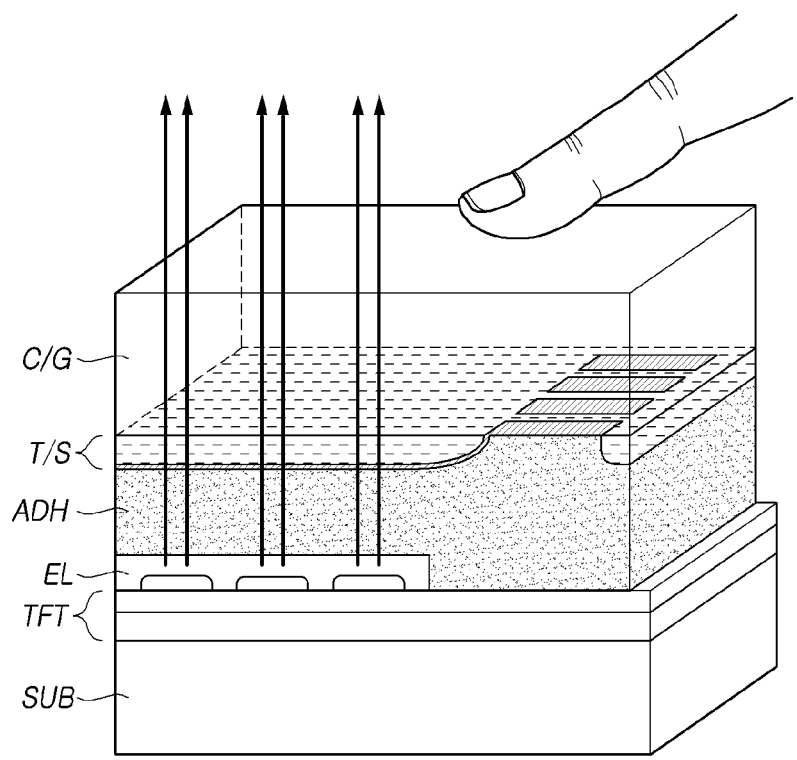
FIG. 3 is a diagram illustrating an example of the schematic structure of a touch sensing unit included in a touch display device according to embodiments of the present disclosure.

FIG. 3 is a diagram illustrating an example of the schematic structure of a touch sensing unit T/S included in a touch display device 100 according to embodiments of the present disclosure.

Referring to FIG. 3, a thin film transistor layer TFT including a thin film transistor and the like for driving the display can be arranged on a substrate SUB, and an emission layer EL can be arranged on the thin film transistor layer TFT. In addition, an adhesive layer ADH can be arranged on the emission layer EL, and a touch sensing unit T/S can be arranged on the adhesive layer ADH. A cover glass C/G can be arranged on the touch sensing unit T/S.

For example, the touch sensing unit T/S can be bonded to the panel, in which electrodes, lines, emission elements, and the like for driving the display are arranged, through the adhesive layer ADH, thereby implementing the touch display device 100.

Like the example described above, the touch sensing unit T/S can include touch electrodes TE and touch routing lines TL.

In addition, the touch sensing unit T/S can be implemented by stacking the touch electrodes TE and the touch routing lines TL on the adhesive layer ADH in the order of arrangement thereof, or can be implemented by stacking the touch electrodes TE and the touch routing lines TL on the adhesive layer ADH in the reverse order of arrangement thereof. For example, in some cases, the touch sensing unit T/S implemented by arranging the touch electrodes TE and the like can be arranged on the adhesive layer ADH in an inverted state, thereby implementing the touch display device 100.

Figure 4:
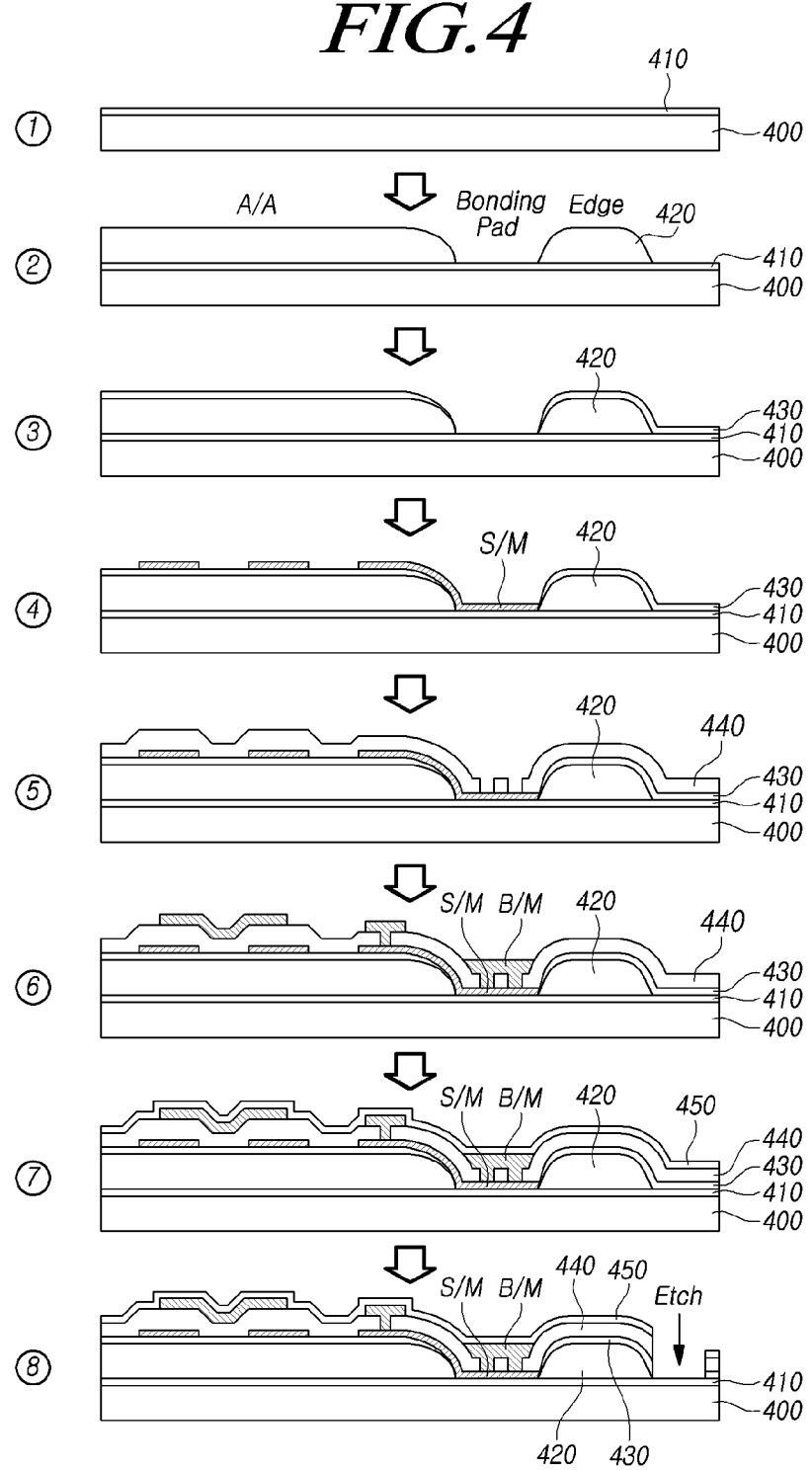
FIG. 4 is a diagram illustrating an example of manufacturing a touch sensing unit included in a touch display device according to embodiments of the present disclosure.

FIG. 4 is a diagram illustrating an example of manufacturing a touch sensing unit T/S included in a touch display device 100 according to the embodiments of the present disclosure.

Referring to FIG. 4, a sacrificial layer 410 is disposed on a base layer 400 (①). The base layer 400 can be, for example, Mo/Al, and the sacrificial layer 410 can be amorphous silicon or SiNx.

A photo acrylic layer 420 can be disposed on the sacrificial layer 410 (②). The photo acrylic layer 420 can be disposed in the active area A/A in which touch electrodes TE and the like are arranged and in an edge area corresponding to the boundary of the touch display panel 110. In addition, the photo acrylic layer 420 may not be provided in the area in which a pad, to which touch routing lines TL and a touch sensing circuit 150 are electrically connected, is arranged.

A barrier layer 430 formed of SiNx can be disposed on the photo acrylic layer 420 (③), and a sensor metal S/M can be disposed on the barrier layer 430 (④) The sensor metal S/M can be made of, for example, Ti/Al/Ti, and can constitute touch electrodes TE in a touch sensing unit T/S. Alternatively, in some cases, the sensor metal S/M can be used to implement touch routing lines TL.

An insulating layer 440 can be disposed on the sensor metal S/M (5̂), and a bridge metal B/M can be disposed on the insulating layer 440 (6̂). The bridge metal B/M can be made of, for example, Ti/Al/Ti, and can be used as the lines for connecting the touch electrodes TE to each other in the touch sensing unit T/S, or can be used as the lines for connecting the touch electrodes TE to the touch routing lines TL. Alternatively, in some cases, the bridge metal B/M can be used to implement the touch electrodes TE or the touch routing lines TL.

A protective layer 450 can be disposed on the bridge metal B/M (7̂), and the exterior of the edge area can be etched, thereby implementing the touch sensing unit T/S (8̂).

The touch sensing unit T/S implemented through the processes described above can be disposed, in an inverted state, on the adhesive layer ADH. In addition, the base layer 400 can be separated by removing the sacrificial layer 410 through a method such as laser-lift-off (LLO) or the like, and a cover glass C/G can be disposed thereon, thereby implementing the touch display device 100.

Therefore, the touch display device 100 supplying a touch sensing function can be implemented by easily disposing the touch sensing unit T/S on the panel.

In addition, the touch routing lines TL included in the touch sensing unit T/S can be arranged so as not to overlap the lines arranged in the non-active area N/A of the touch display panel 110, thereby reducing the noise in a signal detected through the touch routing line TL due to the signal applied in order to drive the display.

Figure 5:
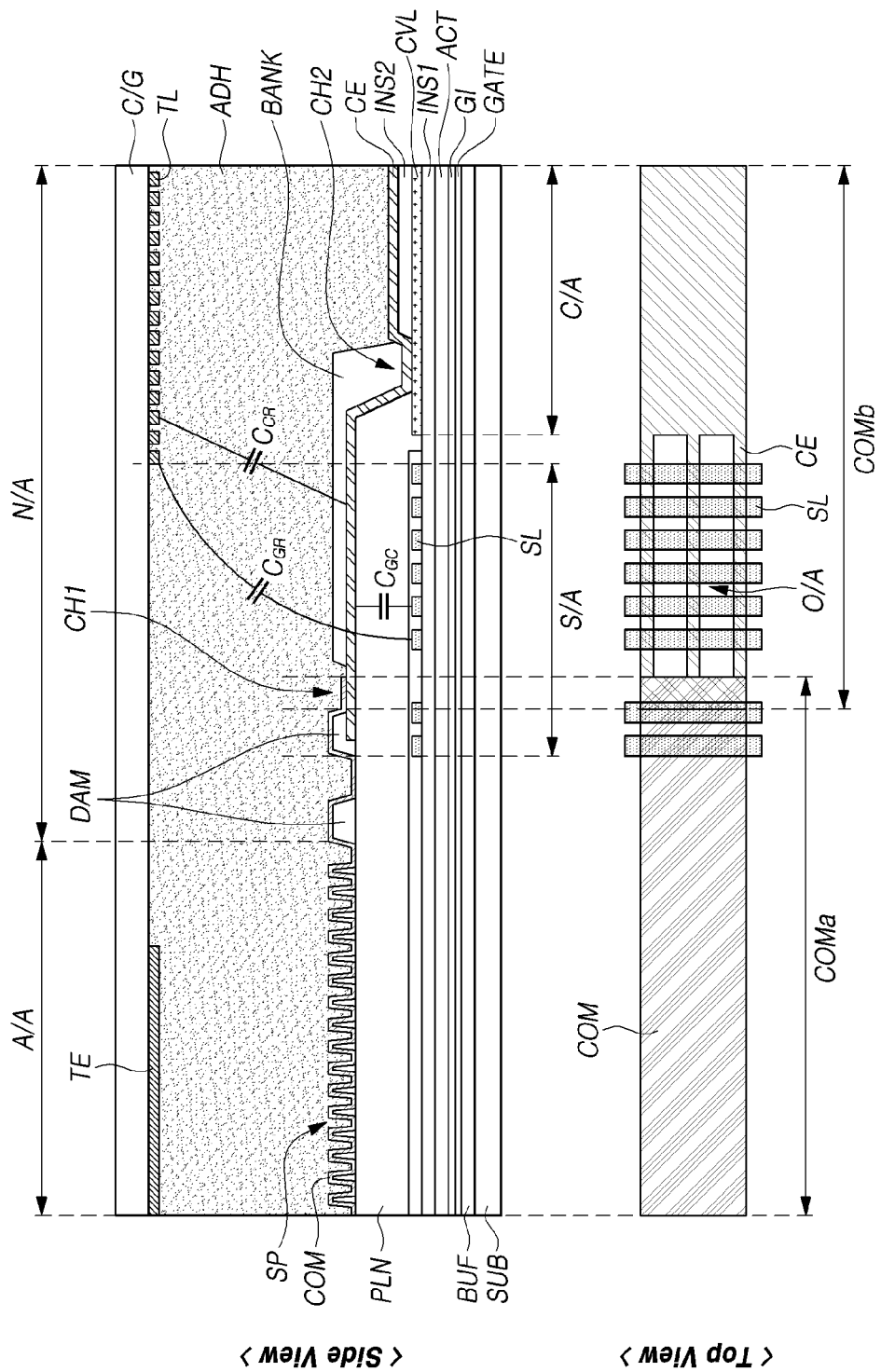
FIG. 5 is a diagram illustrating an example of the structure of an area in which touch electrodes and touch routing lines are arranged in a touch display device according to embodiments of the present disclosure.
Figure 6:
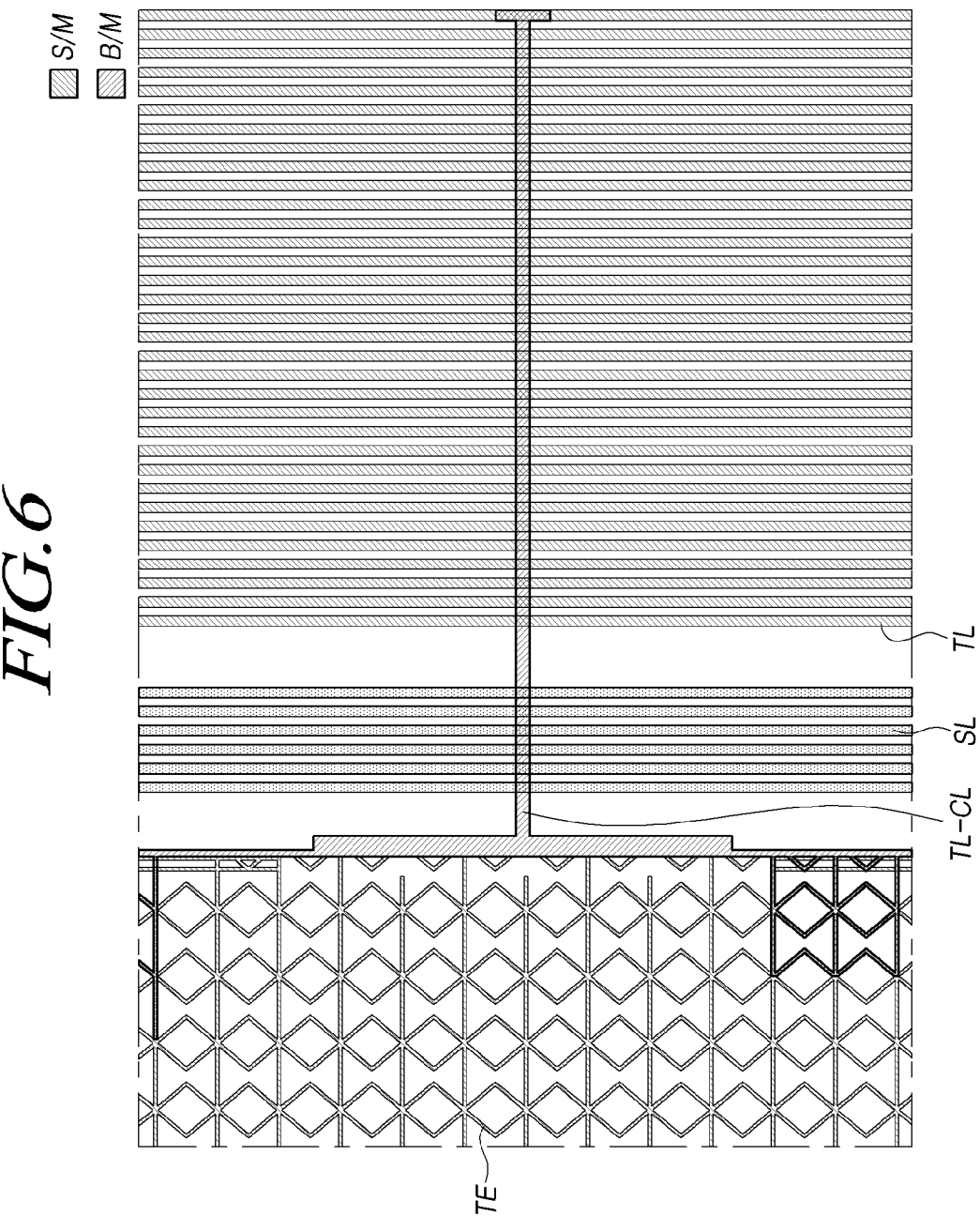
FIG. 6 is a diagram illustrating an example of the detailed planar structure of an area in which the touch electrodes and the touch routing lines shown in FIG. 5 are arranged.

FIG. 5 is a diagram illustrating an example of the structure of an area in which touch electrodes TE and touch routing lines TL are arranged in a touch display device 100 according to embodiments of the present disclosure, and specifically, FIG. 5 illustrates an example of the structure of a boundary area between an active area A/A in which touch electrodes TE are arranged and a non-active area N/A in which touch routing lines TL are arranged. In addition, FIG. 6 is a diagram illustrating an example of the detailed planar structure of an area in which the touch electrodes TE and the touch routing lines TL shown in FIG. 5 are arranged.

Referring to FIG. 5, an adhesive layer ADH can be disposed on various electrodes and lines for driving a display, and touch electrodes TE and touch routing lines TL constituting a touch sensing unit T/S can be disposed on the adhesive layer ADH.

For example, a buffer layer BUF can be disposed on a substrate SUB, and a gate electrode layer GATE can be disposed on the buffer layer BUF. Gate electrodes disposed on the gate electrode layer GATE can be arranged to constitute gate electrodes of thin film transistors or various lines such as gate lines GL or the like. A gate insulating layer GI can be disposed on the gate electrode layer GATE, and an active layer ACT can be disposed on the gate insulating layer GI. A first insulating layer INS1 can be disposed on the active layer ACT, and a source/drain electrode layer can be disposed on the first insulating layer INS1.

The source/drain electrodes disposed on the source/drain electrode layer can be arranged to constitute source electrodes and drain electrodes of thin film transistors or various lines such as data lines DL or the like. For example, the source/drain electrode can constitute a common voltage line CVL supplying a common voltage Vcom to a common electrode COM, and can constitute a signal line SL disposed in the non-active area N/A. The signal line SL can be a line supplying a signal to the gate driving circuit 120, but is not limited thereto. In addition, at least a portion of the signal line SL can be configured using the gate electrode.

A second insulating layer INS2 can be disposed on the signal lines SL and the common voltage line CVL including source/drain electrodes.

A planarization layer PLN can be disposed on the second insulating layer INS2 in the active area A/A, and pixel electrodes arranged in the respective subpixels SP, a bank BANK separating the area of the subpixels SP, a common electrode COM, and the like can be disposed on the planarization layer PLN. In addition, an encapsulation layer for protecting emission elements and the like can be disposed on the common electrode COM.

One or more dams DAM including banks BANK can be disposed in the boundary area between the active area ALA and the non-active area N/A on the second insulating layer INS2. The dams DAM can prevent the encapsulation layer from collapsing.

A connection electrode CE connecting the common electrode COM to the common voltage line CVL can be disposed in the non-active side N/A on the second insulating layer INS2. The connection electrode CE can be made of the same material as the pixel electrode disposed in the subpixel SP in the active area A/A. In addition, the connection electrode CE can be electrically connected to the common electrode COM disposed in the active area A/A through a first contact hole CH1, and can be electrically connected to the common voltage line CVL disposed in the non-active area N/A through a second contact hole CH2. For example, a common voltage Vcom applied to the common voltage line CVL can be supplied to the common electrode COM through the connection electrode CE. The common electrode COM can be regarded as a first common electrode COMa, and the connection electrode CE can be regarded as a second common electrode COMb.

An adhesive layer ADH can be disposed on the above-described elements for driving the display, and the touch electrodes TE, the touch routing lines TL, and the like can be arranged on the adhesive layer ADH.

At least a portion of the touch routing lines TL can be arranged in the area excluding the area overlapped with the signal lines SL positioned below the adhesive layer ADH. Alternatively, all of the touch routing lines TL can be arranged so as not to overlap the signal lines SL positioned below the adhesive layer ADH, as shown in FIG. 5. For example, the touch routing lines TL can be arranged to overlap a common voltage line area C/A in which the common voltage line CVL is disposed, instead of overlapping a signal line area S/A in which the signal lines SL are arranged.

Referring to FIG. 6 illustrating an example of the detailed arrangement structure of the touch electrodes TE and the touch routing lines TL, the boundary area between the active area A/A and the non-active area N/A is illustrated as seen from the bottom of the signal lines SL.

The touch electrodes TE can be arranged using a sensor metal S/M, which can be in the form of a mesh having openings corresponding to emission areas as shown in FIG. 6. Like the touch electrodes TE, the touch routing lines TL can also be arranged using the sensor metal S/M. Alternatively, in some cases, the touch routing lines TL can be arranged using a bridge metal B/M.

The touch electrodes TE and the touch routing lines TL can be electrically connected to each other by a routing connection line TL-CL folioed of a bridge metal B/M. The routing connection line TL-CL can be disposed such that a portion thereof overlaps the touch electrodes TE, and can be electrically connected to the touch electrodes TE through contact holes positioned in the overlapping area. In addition, the routing connection line TL-CL can be disposed such that a portion thereof overlaps the touch routing lines TL, and can be electrically connected to the touch routing lines TL through contact holes provided in the overlapping area.

The signal lines SL can be arranged in the area between the touch electrodes TE and the touch routing lines TL.

For example, the signal lines SL can be arranged in the non-active area N/A so as to overlap the area between the touch electrodes TE and the touch routing lines TL, thereby reducing the parasitic capacitance formed between the signal lines SL and the touch routing lines TL.

Accordingly, it is possible to reduce the noise that occurs in the touch sensing signal detected through the touch routing line TL due to the parasitic capacitance $C_{GR}$ folioed between the signal lines SL and the touch routing lines TL when signals for driving a display are applied to the signal lines SL.

In addition, the connection electrode CE positioned on the signal lines SL and below the touch routing lines TL can include at least one opening O/A positioned in the area overlapping the signal lines SL.

Since the connection electrode CE includes the opening O/A in the area overlapping the signal lines SL, the size of the area in which the connection electrode CE overlaps the signal lines SL can be reduced. By reducing the size of the area in which the connection electrode CE overlaps the signal lines SL, the parasitic capacitance $C_{GC}$ formed between the signal lines SL and the connection electrode CE can be reduced. Accordingly, it is possible to reduce the effect of variation in the voltage level of the connection electrode CE due to the signals applied to the signal lines SL on the touch routing lines TL through parasitic capacitance $C_{CR}$ between the connection electrode CE and the touch routing lines TL.

For example, it is possible to reduce the direct noise due to the signal lines SL by preventing the touch routing lines TL from overlapping the signal lines SL, and the indirect noise through the connection electrode CE is able to be reduced by reducing the area in which the signal lines SL overlaps the connection electrode CE.

In addition, the embodiments of the present disclosure can have a shielding electrode SE disposed between the signal lines SL and the touch routing lines TL in order to disperse noise due to the signal lines SL, thereby further reducing the noise of the touch sensing signal detected through the touch routing lines TL, which is attributable to the signal lines SL.

Figure 7:
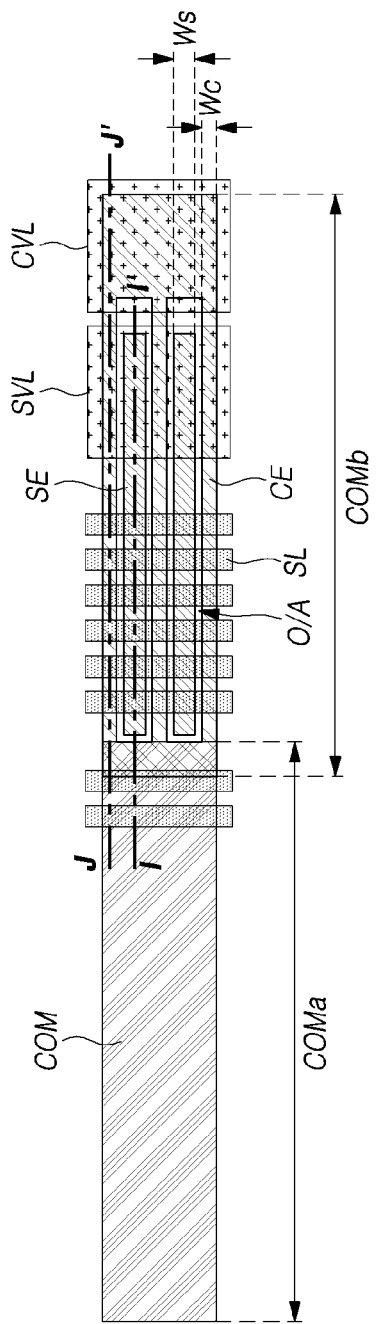
FIG. 7 is a diagram illustrating an example of the planar structure of a connection electrode and a shielding electrode disposed under touch routing lines in a touch display device according to embodiments of the present disclosure.

FIG. 7 is a diagram illustrating an example of the planar structure of a connection electrode CE and a shielding electrode SE arranged below touch routing lines TL in a touch display device 100 according to embodiments of the present disclosure.

Referring to FIG. 7, a common electrode COM is arranged below the adhesive layer ADH, on which the touch sensing unit T/S is arranged, in the active area A/A. In addition, the common electrode COM can be connected to a connection electrode CE arranged in the non-active area N/A, and can be electrically connected to a common voltage line CVL through the connection electrode CE.

Signal lines SL can be arranged below the connection electrode CE in the non-active area N/A, and the connection electrode CE can have at least one opening O/A overlapping the signal lines SL. Accordingly, the opening O/A in the connection electrode CE can reduce the area in which the connection electrode CE overlaps the signal lines SL.

A shielding electrode SE folioed of the same material as the connection electrode CE can be arranged in the opening O/A in the connection electrode CE so as to be insulated from the connection electrode CE.

For example, the shielding electrode SE can be foamed of the same material as the pixel electrode arranged in the subpixel SP, and can be arranged to be separate from the connection electrode CE. In addition, since the opening O/A in the connection electrode CE is formed to intersect the signal lines SL, the shielding electrode SE positioned in the opening O/A can also be arranged to intersect the signal lines SL.

The shielding electrode SE can be folioed of the same material as the common voltage line CVL, and can be electrically connected to a shielding voltage line SVL that is disposed to be separate from the common voltage line CVL.

A common voltage Vcom can be supplied to the common electrode COM through the common voltage line CVL, and a constant voltage can be supplied to the shielding electrode SE through the shielding voltage line SVL.

In this case, the constant voltage supplied to the shielding electrode SE can be equal to the common voltage Vcom applied to the common electrode COM. Alternatively, the constant voltage supplied to the shielding electrode SE can be different from the common voltage Vcom applied to the common electrode COM. In addition, the voltage applied to the shielding electrode SE can be a ground voltage.

A path for supplying the constant voltage to the shielding electrode SE and a path for supplying the common voltage Vcom to the common electrode COM can be separated from each other. For example, even in the case where the same voltage as the common voltage Vcom is supplied to the shielding electrode SE, the shielding electrode SE can receive a constant voltage through a path that is electrically isolated from the path for supplying the common voltage Vcom to the common electrode COM.

Since the shielding electrode SE is disposed in the opening O/A in the connection electrode CE and since a constant voltage is applied to the shielding electrode SE, the shielding electrode SE can form parasitic capacitance with the signal lines SL arranged below the shielding electrode SE.

Accordingly, it is possible to block a portion of the parasitic capacitance that can be formed between the signal lines SL and the touch routing lines TL, which are arranged on the adhesive layer ADH, through the opening O/A in the connection electrode CE.

In addition, since the signal lines SL form parasitic capacitance with the shielding electrode SE, the parasitic capacitance formed between the signal lines SL and the connection electrode CE can be reduced.

Since the parasitic capacitance formed between the signal lines SL and the connection electrode CE is reduced, the amount of noise transmitted to the touch routing lines TL through the connection electrode CE by the signal applied to the signal lines SL can be reduced.

The width Ws of the shielding electrode SE can be greater than the width Wc of the connection electrode CE. For example, the width of the shielding electrode SE positioned in the opening O/A can be greater than the width of a part of the connection electrode CE, which is positioned between the openings O/A in the connection electrode CE.

Accordingly, the area in which the signal line SL overlaps the shielding electrode SE can be greater than the area in which the signal line SL overlaps the connection electrode CE, and the difference in the overlapping area can increase the effect of noise dispersion through the shielding electrode SE.

As described above, in the structure in which the connection electrode CE, which is arranged on the signal lines SL in the non-active area N/A and is electrically connected to the common electrode COM, has an opening O/A formed therein, it is possible to distribute the noise due to the signal lines SL through the shielding electrode SE by arranging the shielding electrode SE, to which a constant voltage is applied, in the opening O/A in the connection electrode CE.

In addition, the effect of the noise due to the signal lines SL on the touch routing lines TL can be reduced by dispersing the noise due to the signal lines SL through the shielding electrode SE, thereby improving touch sensing performance through the touch routing lines TL.

Figure 8:
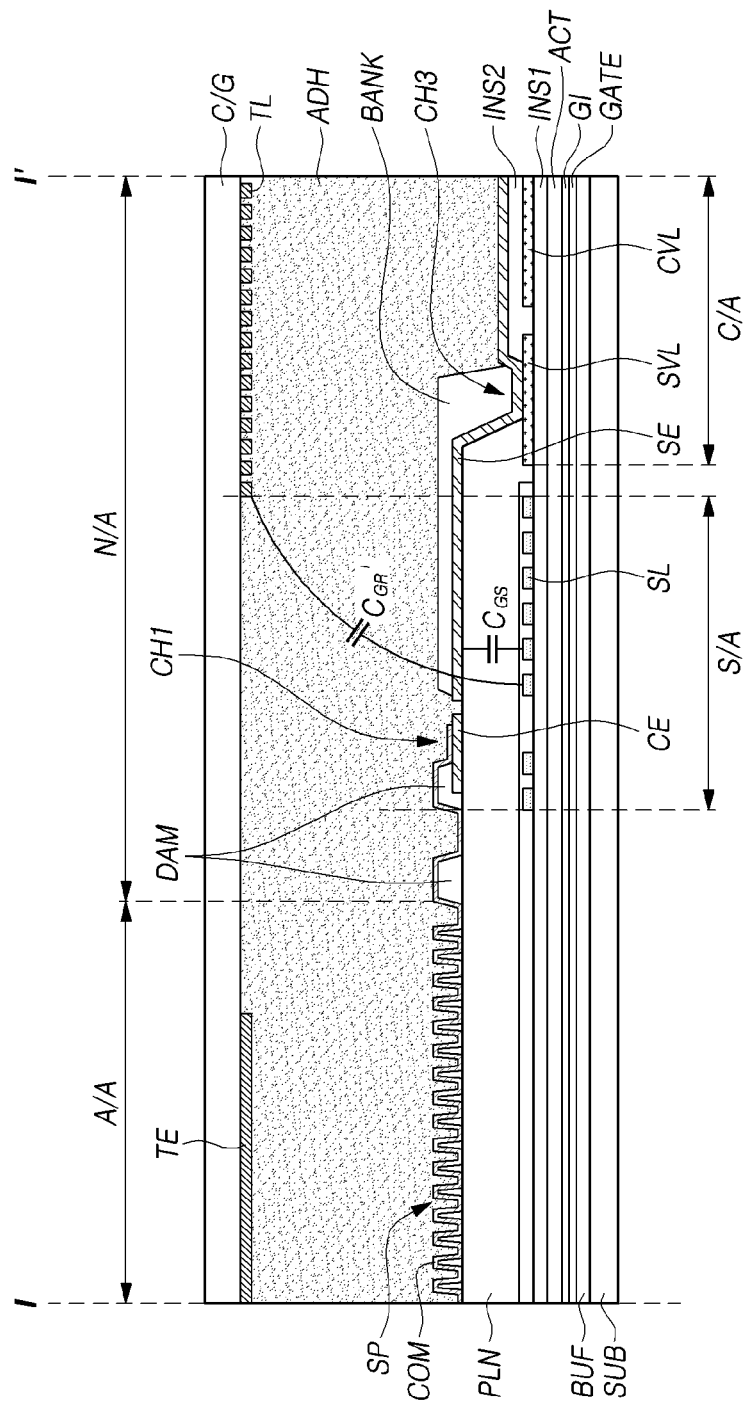
FIG. 8 is a cross-sectional view illustrating an example of the structure of the area taken along the line I-I' in FIG. 7.
Figure 9:
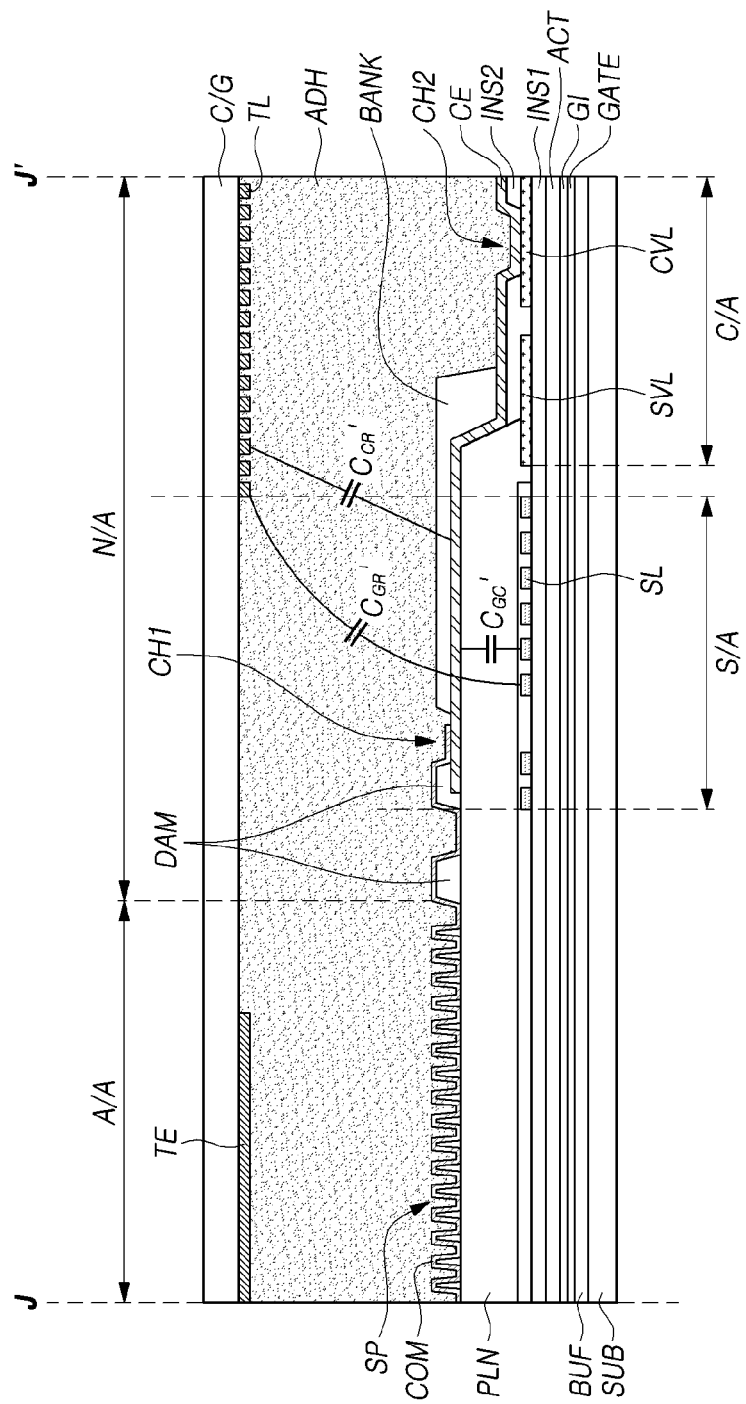
FIG. 9 is a cross-sectional view illustrating an example of the structure of the area taken along the line J-J' in FIG. 7.

FIG. 8 is a cross-sectional view illustrating an example of the structure of the area taken along the line I-I' in FIG. 7. In addition, FIG. 9 is a cross-sectional view illustrating an example of the structure of the area taken along the line J-J' in FIG. 7.

Referring to FIG. 8, signal lines SL can be arranged below an adhesive layer ADH in the non-active area N/A. In addition, touch routing lines TL can be arranged on the adhesive layer ADH such that at least some thereof do not overlap the signal lines SL.

A shielding electrode SE can be arranged in the opening O/A in a connection electrode CE, which is arranged on the signal lines SL, so as to be insulated from the connection electrode CE.

The shielding electrode SE can be arranged to be separate from the connection electrode CE, and can be electrically connected to a shielding voltage line SVL, which is arranged to be separate from the common voltage line CVL, through a third contact hole CH3. In addition, a constant voltage can be supplied to the shielding electrode SE through the shielding voltage line SVL.

Since the shielding electrode SE is arranged on the signal line SL, parasitic capacitance $C_{GS}$ can be formed between the signal line SL and the shielding electrode SE. In addition, the formation of the parasitic capacitance between the signal line SL and the shielding electrode SE can chage the parasitic capacitance $C_{GR}'$ folioed between the signal line SL and the touch routing line TL.

For example, the parasitic capacitance $C_{GR}'$ formed between the signal line SL and the touch routing line TL can be smaller than the parasitic capacitance $C_{GR}$ formed between the signal line SL and the touch routing line TL in the case where the shielding electrode SE is not provided.

As described above, the parasitic capacitance directly formed between the signal line SL and the touch routing line TL can be reduced by providing the shielding electrode SE, thereby reducing the noise of a touch sensing signal due to the signal lines SL, which is detected through the touch routing lines TL.

In addition, the formation of the parasitic capacitance between the shielding electrode SE and the signal line SL can reduce the parasitic capacitance folioed between the signal line SL and the connection electrode CE.

Referring to FIG. 9, the connection electrode CE can be arranged between the signal lines SL and the touch routing lines TL in the non-active area N/A. In addition, the connection electrode CE can be electrically connected to the common electrode COM through a first contact hole CH1, and can also be electrically connected to the common voltage line CVL through a second contact hole CH2.

Since the shielding electrode SE, to which a constant voltage is applied, is arranged in the opening O/A in the connection electrode CE, the parasitic capacitance $C_{GC}'$ folioed between the signal line SL and the connection electrode CE can be different from that in the case where the shielding electrode SE is not provided. For example, since the parasitic capacitance due to the signal lines SL is distributed by the shielding electrode SE, the parasitic capacitance $C_{GC}'$ can be smaller than the parasitic capacitance $C_{GC}$ folioed between the signal line SL and the connection electrode CE in the case where the shielding electrode SE is not provided.

Therefore, the amount of noise transmitted due to the parasitic capacitance $C_{GC}'$ between the signal line SL and the connection electrode CE can be reduced through the parasitic capacitance $C_{CR}'$ between the connection electrode CE and the touch routing line TL.

For example, assuming that the parasitic capacitance due to the signal line SL is almost the same between the case where the shielding electrode SE is not provided and the case where the shielding electrode SE is provided, the parasitic capacitance $C_{GR}$ $C_{GC}$ due to the signal lines SL in the case where the shielding electrode SE is not provided can be almost the same as the parasitic capacitance $C_{GR}'+C_{GC}'+C_{GS}$ due to the signal lines SL in the case where the shielding electrode SE is provided. Therefore, since $C_{GR}+C_{GC}>C_{GR}'+C_{GC}'$, the parasitic capacitance foiled between the signal lines SL and the touch routing lines TL can be reduced.

As described above, embodiments of the present disclosure can prevent the touch routing lines TL from overlapping the signal lines SL in the non-active area N/A, thereby reducing the direct noise caused by the parasitic capacitance due to the signal lines SL.

In addition, the connection electrode CE positioned between the signal lines SL and the touch routing lines TL can have an opening O/A formed in the area in which the connection electrode CE overlaps the signal lines SL, so the parasitic capacitance formed between the connection electrode CE and the signal line SL can be reduced, thereby reducing indirect noise through the connection electrode CE.

In addition, the parasitic capacitance due to the signal lines SL can be distributed by arranging the shielding electrode SE, to which a constant voltage is applied, in the opening O/A in the connection electrode CE so as to be insulated from the connection electrode CE, thereby further reducing the noise caused by the parasitic capacitance between the signal lines SL and the touch routing lines TL.

In addition, the form of the opening O/A in the connection electrode CE and the form of the shielding electrode SE arranged in the opening O/A in the non-active area N/A can vary according to the arrangement of the common voltage line CVL and the shielding voltage line SVL.

Figure 10:
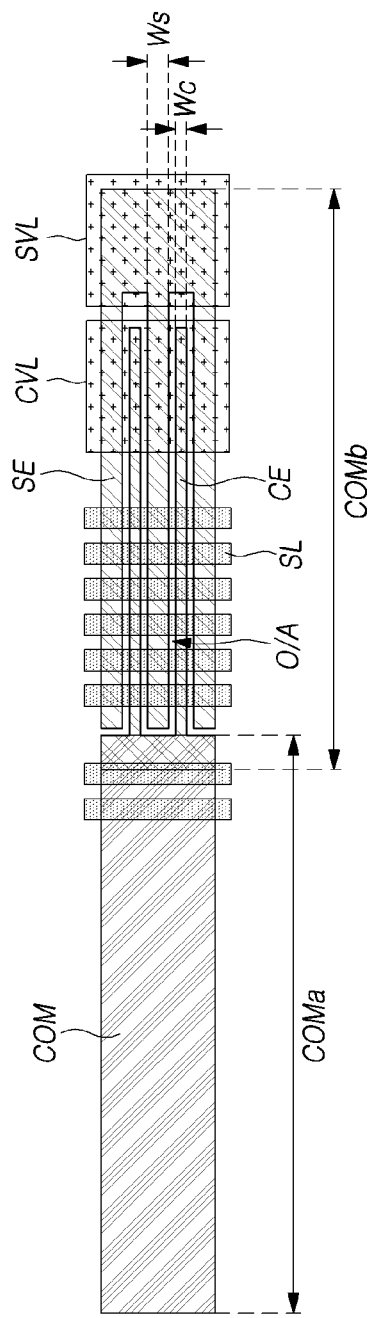
FIG. 10 is a diagram illustrating another example of the planar structure of a connection electrode and a shielding electrode disposed under touch routing lines in a touch display device according to embodiments of the present disclosure.

FIG. 10 is a diagram illustrating another example of the planar structure of a connection electrode CE and a shielding electrode SE arranged under touch routing lines TL in a touch display device 100 according to embodiments of the present disclosure.

Referring to FIG. 10, a common electrode COM can be arranged below an adhesive layer ADH in the active area A/A. In addition, a connection electrode CE electrically connected to the common electrode COM can be arranged below the adhesive layer ADH in the non-active area N/A. Signal lines SL can be arranged below the connection electrode CE, and the connection electrode CE can have at least one opening O/A folioed in the area in which the connection electrode CE overlaps the signal lines SL.

A shielding electrode SE, to which a constant voltage is applied, can be arranged in the opening O/A so as to be insulated from the connection electrode CE.

In addition, the connection electrode CE and the shielding electrode SE can be electrically connected to a common voltage line CVL and a shielding voltage line SVL, respectively, which are arranged to be separate from each other.

In some cases, the common voltage line CVL can be positioned at the inner side of the shielding voltage line SVL. In addition, one side of the opening O/A in the connection electrode CE connected to the common voltage line CVL can be removed.

For example, the connection electrode CE can be arranged in the structure in which the part of the connection electrode CE that is connected to the common voltage line CVL is divided in order to allow the shielding electrode SE, which is connected to the shielding voltage line SVL positioned at the outer side of the common voltage line CVL, to be arranged in the opening O/A in the connection electrode CE.

Therefore, both the connection electrode CE and the shielding electrode SE can take the form of a comb so that they alternate in the non-active area N/A.

Even in this case, in order to reduce parasitic capacitance through the shielding electrode SE, the area in which the shielding electrode SE overlaps the signal line SL can be greater than the area in which the connection electrode CE overlaps the signal line SL. For example, the width Ws of the shielding electrode SE can be greater than the width We of the connection electrode CE.

As described above, the noise due to the signal lines SL can be dispersed by arranging the shielding electrode SE, to which a constant voltage is applied, in the area in which the connection electrode CE is not arranged in the area overlapping the signal lines SL, thereby reducing the noise of a touch sensing signal detected through the touch routing lines TL.

In addition, the arrangement of the shielding electrode SE is not limited to the example described above, and the shielding electrode SE can be arranged in various foils depending on the form of the opening O/A formed in the connection electrode CE.

According to the embodiments of the present disclosure described above, it is possible to reduce the amount of noise caused by parasitic capacitance due to the signal lines SL by arranging the touch routing lines TL so as not to overlap the signal lines SL and by configuring the connection electrode CE, which is positioned between the touch routing lines TL and the signal lines SL, to have an opening O/A folioed in the area overlapping the signal lines SL.

In addition, the noise due to the signal lines SL can be dispersed through the shielding electrode SE by arranging the shielding electrode SE, to which a constant voltage is applied, in the opening O/A in the connection electrode CE.

Therefore, it is possible to further reduce the noise of a touch sensing signal due to the parasitic capacitance folioed by the signal lines SL arranged in the non-active area N/A and to improve touch sensing performance of the touch display device 100.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure.

Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
    an active area in which a plurality of subpixels is arranged;
    a non-active area positioned outside the active area and in which a plurality of signal lines is arranged;
    a plurality of touch electrodes arranged in the active area;
    a plurality of touch routing lines arranged in the non-active area and electrically, connected to the touch electrodes;
    a connection electrode positioned between the signal lines and the touch routing lines in the non-active area, and electrically connected to a common electrode disposed in the subpixel, wherein at least a portion of the connection electrode comprises at least one opening positioned in an area overlapped with the signal lines; and
    at least one shielding electrode disposed in the at least one opening in the connection electrode so as to be insulated from the connection electrode,
    wherein a constant voltage is applied the at least one shielding electrode, and
    wherein the touch electrodes and the touch routing line are formed of a sensor metal, and are electrically connected to each other through a connection line that is formed of a bridge metal disposed in a different layer from the sensor metal.

2. The touch display device of claim 1, further comprising:
    a common voltage supply line configured to supply a common voltage to the common electrode through the connection electrode; and
    a shielding voltage supply line arranged in the same layer as the common voltage supply line so as to be separate from the common voltage supply line, the shielding voltage supply line configured to supply the constant voltage to the at least one shielding electrode.

3. A touch display device, comprising:
    an active area in which a plurality of subpixels is arranged;
    a non-active area positioned outside the active area and in which a plurality of signal lines is arranged;
    a plurality of touch electrodes arranged in the active area;
    a plurality of touch routing lines arranged in the non-active area and electrically connected to the touch electrodes;
    a connection electrode positioned between the signal lines and the touch routing lines in the non-active area, and electrically connected to a common electrode disposed in the subpixel, wherein at least a portion of the connection electrode comprises at least one opening positioned in an area overlapped with the signal lines; and
    at least one shielding electrode disposed in the at least one opening in the connection electrode so as to be insulated from the connection electrode,
    wherein a constant voltage is applied the at least one shielding electrode, and wherein the constant voltage applied to the at least one shielding electrode is different from the common voltage applied to the common electrode.

4. The touch display device of claim 1, wherein the constant voltage applied to the at least one shielding electrode is a ground voltage.

5. The touch display device of claim 1, wherein the at least one shielding electrode is arranged to intersect the signal lines.

6. The touch display device of claim 1, wherein the at least one opening in the connection electrode includes openings, and
a width of a part positioned between the openings in the connection electrode is less than a width of the at least one shielding electrode.

7. The touch display device of claim 1, wherein the connection electrode and the at least one shielding electrode are formed of the same material as a pixel electrode disposed in one of the subpixels.

8. The touch display device of claim 1, wherein at least some of the touch routing lines are arranged in an area excluding the area overlapping the signal lines.

9. The touch display device of claim 1, wherein at least some of the touch routing lines are arranged in an area excluding the area overlapping the opening in the connection electrode.

10. The touch display device of claim 1, further comprising an adhesive layer arranged under the touch electrodes and the touch routing lines.

11. The touch display device of claim 10, further comprising an encapsulation layer arranged between the common electrode and the adhesive layer.

12. A touch display device comprising:
a substrate comprising an active area in which a plurality of subpixels is arranged and a non-active area in which a plurality of signal lines is arranged;
an adhesive layer arranged on the substrate;
a touch sensing unit arranged on the adhesive layer, and comprising a plurality of touch electrodes arranged on the active area and a plurality of touch routing lines arranged on the non-active area;
a connection electrode positioned between the signal lines and the adhesive layer in the non-active area, and electrically connected to a common electrode disposed in the subpixel, wherein at least a portion of the connection electrode comprises at least one opening positioned in an area overlapped with the signal lines; and
at least one shielding electrode disposed in the at least one opening of the connection electrode so as to be insulated from the connection electrode,
wherein a constant voltage is applied to the at least one shielding electrode, and
wherein at least some of the plurality of touch routing lines are arranged in an area excluding the area overlapping the at least one opening in the connection electrode.

13. The touch display device of claim 12, further comprising
a common voltage supply line configured to supply a common voltage to the common electrode through the connection electrode; and
a shielding voltage supply line arranged in the same layer as the common voltage supply line so as to be separate from the common voltage supply line, and configured to supply the constant voltage to the at least one shielding electrode.

14. The touch display device of claim 12, wherein the area in which the at least one shielding electrode overlaps the signal line is greater than the area in which the connection electrode overlaps the signal line.

15. The touch display device of claim 12, wherein the connection electrode and the at least one shielding electrode are formed of the same material as a pixel electrode disposed in one of the subpixels.

16. The touch display device of claim 12, wherein the signal lines overlap an area between the touch electrodes and the touch routing lines.

* * * * *